UNITED STATES PATENT OFFICE.

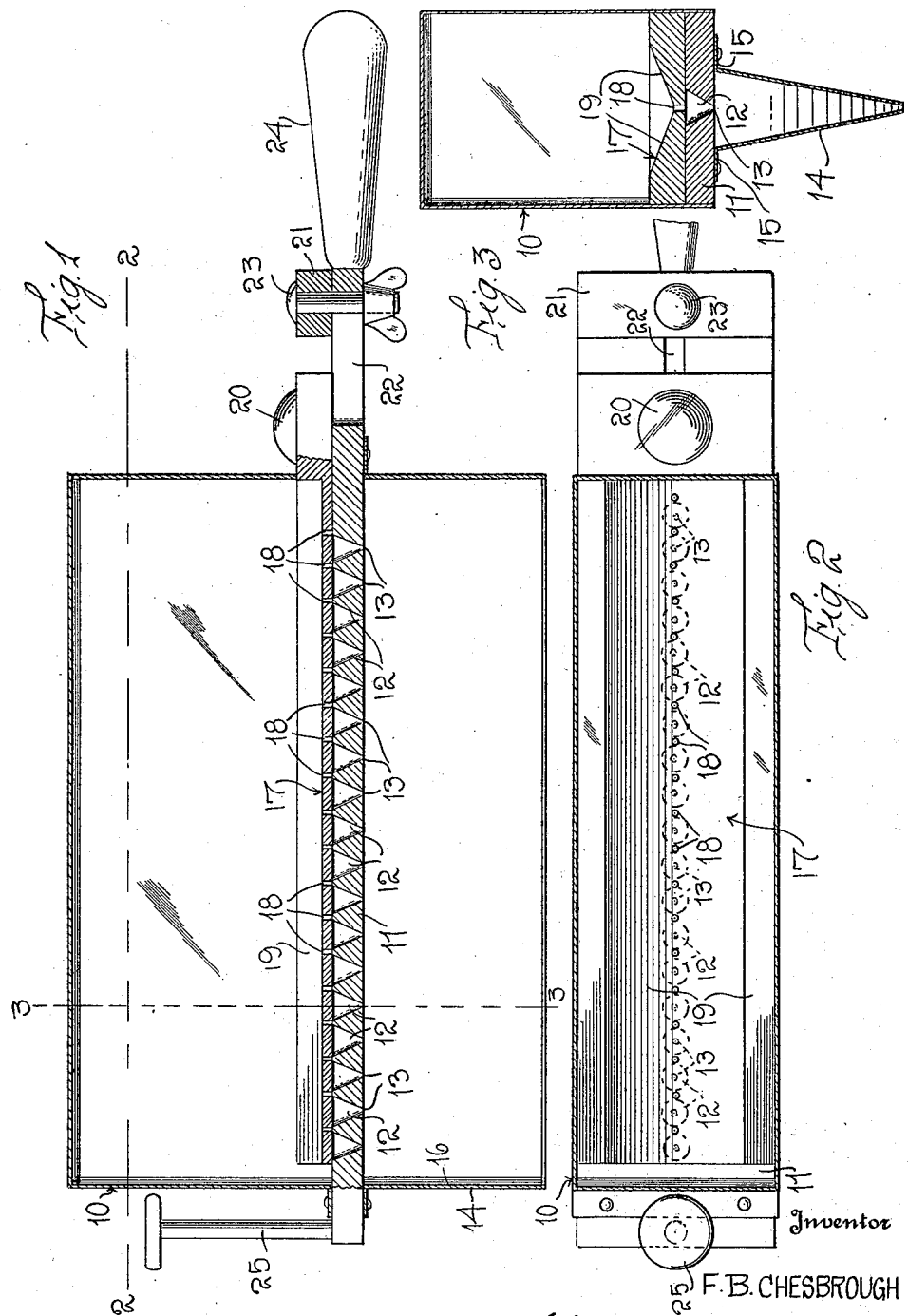

FREMONT B. CHESBROUGH, OF NEW YORK, N. Y.

SEED-PLANTER.

1,274,855.

Specification of Letters Patent.   Patented Aug. 6, 1918.

Application filed September 22, 1917. Serial No. 192,762.

*To all whom it may concern:*

Be it known that I, FREMONT B. CHESBROUGH, a citizen of the United States, residing at New York, in the county of Kings and State of New York, have invented certain new and useful Improvements in Seed-Planters, of which the following is a specification, reference being had to the accompanying drawings.

This invention relates to seed planters, and particularly to planters designed for planting small garden seeds, such as beets, turnips, lettuce, etc.

The general object of the invention is to provide a planting device of a very simple and cheap construction, which may be readily operated by hand and by which the seeds may be evenly distributed in a furrow formed by the planter itself.

A further object is to provide a device of this character comprising a seed box, a furrow or trench forming device, which is hollow, and provide means whereby the seeds may be agitated and distributed and allowed to fall into the trench forming device and so into the trench or furrow formed thereby.

Other objects will appear in the course of the following description.

My invention is illustrated in the accompanying drawings, wherein:—

Figure 1 is a longitudinal vertical sectional view through a seed planter constructed in accordance with my invention;

Fig. 2 is a section on the line 2—2 of Fig. 1;

Fig. 3 is a section on the line 3—3 of Fig. 1.

Referring to these figures, 10 designates the seed box of the planter, which may be of any suitable dimensions, this seed box having a bottom 11, the bottom being formed to provide a plurality of hopper shaped recesses or cups 12, each open at its lower end as at 13. Disposed below the bottom 11 is a trench or furrow former 14, which is formed of two plates of metal, each plate of metal being angularly flanged at its upper end, as at 15, so as to be attached to the bottom 11, the two plates extending downward toward each other in convergent relation, but being spaced from each other at their lower ends to leave a longitudinal passage through which the seed may drop. The forward end of this trench or furrow former is closed by a wall 16 and the rear end may be either opened or closed, as desired, but is preferably closed.

Disposed within the seed box 10, and resting upon the bottom 11, is a reciprocating seed plate 17, having a plurality of passages or perforations 18. These passages 18 are arranged on the middle line of the plate and in alinement with the openings 13, and the upper face of this plate is cut away to provide downwardly and medially inclined faces 19, so that the seed within the seed box will be caused to gravitate toward the perforations 18. The plate 17 extends out through an opening in the end wall of the seed box and is provided with a thumb piece 20, whereby the plate may be readily reciprocated. The bottom 11 also extends out beyond both end walls of the seed box and at one end is slotted as at 22 for the passage of a bolt 23. This bolt engages with a stop 21, which is movable toward or from the adjacent end wall of the seed box to thus adjustably limit the degree of reciprocation of the slide 17. The adjacent end of the bottom 11 is formed with a handle 24, and the opposite end of the bottom is provided with the upwardly extending handle 25.

To operate this device, the V-shaped trench or furrow forming member is pressed into the ground by the handles 25 and 24 and the slide 17 is moved back and forth by the thumb piece 20 depositing the seed in the trench forming member 14, where it falls through into the ground and is covered when the planter is moved along, the operation being continuous to the end of the row to be planted. I have found in practice that this device is particularly effective for planting small seeds and that the work may be done very rapidly and the seed distributed very evenly within the trench or furrow formed by the member 14. It will be of course seen that by providing a trench former narrower than the bottom of the seed box, the trench so formed has a uniform depth, this depth being the depth proper for the planting of such small garden seeds as are to be used with this device. It is obvious that the device is susceptible to modification in many ways, without departing from the spirit of the invention.

It is to be understood that the base plate or bottom 11 is provided with holes large enough to permit the largest seeds desired to be sown to pass through the perforations.

The sliding plate 18 has similar holes and if the stop 21 is so adjusted that the perforations in the slide 17 only partially register with the perforations in the bottom 11, it will be obvious that the quantity and also the size of the seed dropped into the furrow opener would be regulated. If the adjustable stop 21 is so adjusted that the sliding plate 17 can be brought at each reciprocation into full register with the holes in the bottom 11, then it is obvious that seed to the full capacity of the openings will pass through. The smaller the passages in the bottom 11 and the coacting perforations in the slide, the smaller will be the seeds which can be sown.

The reciprocating seed plate 17 provides means for regulating the quantity of seed sown by opening or closing the passages leading from the seed box to the furrow former 14 and it also admits of the sowing of different kinds of seeds, of either large or small size, and finally by the adjustment of the stop element 21 whereby the extent of reciprocating movement of the seed plate may be varied, the seed will be evenly distributed along the entire length of the row, thus effecting considerable economy in the sowing of the seed. When the device is lifted, the earth will cave into the furrow formed by the part 14 and cover the seed.

Having described my invention, what I claim is:—

1. A planting device of the character described, including a seed box having a bottom formed with a plurality of seed receiving recesses terminating in apertures extending through the bottom, a manually reciprocatable slide disposed within the seed box and resting upon the bottom thereof and having perforations extending through the slide, oppositely disposed handles attached to the seed box, one of said handles extending in a horizontal plane and the other handle extending in a vertical plane, one end of the slide extending out through the wall of the seed box and being provided with a thumb piece disposed adjacent the horizontally extending handle, and a stop mounted upon the handle and adjustable toward or from the slide and limiting the reciprocation thereof.

2. A seed planter of the character described including a seed box having a bottom formed with a plurality of discharge perforations, said bottom extending at both ends beyond the box, a vertically extending handle attached to one end of the bottom, the other end of the bottom being longitudinally slotted and having a horizontally disposed handle attached thereto, a slide formed with perforations and disposed within the seed box, one end of the slide extending out through the wall of the seed box and resting upon the slotted portion of the bottom extension and being provided with a thumb piece, a bolt passing through the slot or said bottom extension, and a stop carried upon said bolt and adjustable therewith toward or from the adjacent end of the slide to limit the movement of the slide.

In testimony whereof I hereunto affix my signature in the presence of two witnesses

FREMONT B. CHESBROUGH.

Witnesses:
JOHN BIDERBERG,
I. S. ROSE.

Copies of this patent may be obtained for five cents each, by addressing the "Commissioner of Patents, Washington, D. C."